Oct. 13, 1964   F. J. BETZ   3,152,403
SELF-TESTING DEVICE
Filed June 4, 1962
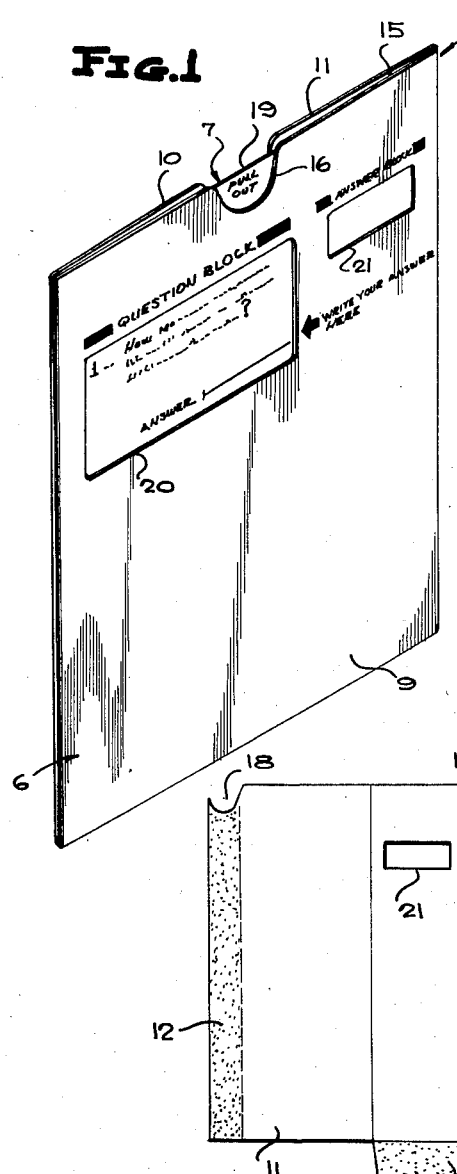
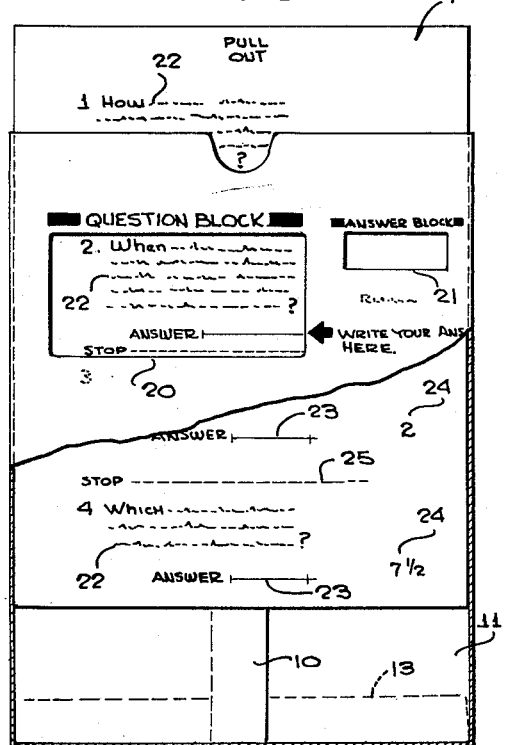
INVENTOR
FREDERIC J. BETZ
BY Chas. R. Allen
ATTORNEY United States Patent Office 3,152,403
Patented Oct. 13, 1964

3,152,403
SELF-TESTING DEVICE
Fredric J. Betz, Clarks Summit, Pa., assignor to International Textbook Company, Scranton, Pa., a corporation of Pennsylvania
Filed June 4, 1962, Ser. No. 200,610
6 Claims. (Cl. 35—9)

This invention relates in general to new and useful improvements in test devices for students, and more particularly relates to a novel self-testing device.

This application is a refiling of my application, Serial No. 120,342, filed June 28, 1961, which application was inadvertently abandoned.

In many instances, it is highly desirable that a student be in a position to make an honest appraisal of his knowledge. This is particularly true in conjunction with correspondence courses where an instructor is not readily available for consultation by the student or to give daily exams.

It is therefore the primary object of this invention to provide a novel self-testing device wherein a question is presented to a student and suitable space is provided for the student's answer, after which, by manipulation of the testing device, the student can ascertain the correct answer and compare his answer therewith.

Another object of this invention is to provide a simple self-testing device which includes a simple jacket in which one or more test papers may be readily packed, each of the test papers having one or more test sections thereon with each of the test sections including a question, a space for the student's answer and the correct answer, and the jacket having suitable openings in a front panel thereof for first making visible to the student the question and the space for the student's answer whereby the student may read the question and write in his answer, after which the test paper may be slid partially out of the jacket and the correct answer will appear in another opening formed in the front panel of the jacket.

A further object of this invention is to provide a novel self-testing device which is suitable for home use, the self-testing device being of an extremely simple construction so as to be economically feasible for use by correspondence schools and the like.

With the above and other objects in view that will hereinafter appear, the nature of the invention will be more clearly understood by reference to the following detailed description, the appended claims and the several views illustrated in the accompanying drawing:

In the drawing:

FIGURE 1 is a perspective view showing the self-testing device which is the subject of this invention.

FIGURE 2 is an elevational view of the testing device of FIGURE 1, with a test sheet thereof partially pulled out of the jacket, and portions of the jacket being broken away and shown in section in order to clearly illustrate the details of both the jacket and the test sheet.

FIGURE 3 is a plan view of the blank from which the jacket is formed, the view being on a reduced scale.

Referring now to the drawings in detail, it will be seen that there is illustrated in FIGURES 1 and 2 the self-testing device which is the subject of this invention, the device being referred to in general by the numeral 5. The self-testing device 5 is formed of a jacket, generally referred to by the numeral 6, and one or more test sheets, generally referred to by the numeral 7.

Reference is now made to FIGURE 3, where there is shown a blank 8 from which the jacket 6 is formed. The blank 8 is generally rectangular in outline and includes a centrally located front panel 9 and a pair of rear panel sections 10 and 11 disposed on opposite sides of the front panel 9. The rear panel section 11 is provided with adhesive 12 on the inner face thereof for securement to the rear panel section 10. The blank 8 also includes a bottom flap 13 having adhesive 14 thereon. The bottom flap 13 is integrally formed along the lower edge of the front panel 9 and is intended to overlap the lower portions of the rear panel sections 10 and 11 and be adhesively secured thereto.

When the blank 8 is assembled to form the jacket 6, it will be apparent that the jacket 6 will have an open upper end 15. It is through this open upper end that test sheets 7 may be inserted or withdrawn. It is to be noted that the upper edge of the front panel 9 is provided with a cutout 16 and the upper edges of the rear panel sections 10 and 11 are provided with suitable cutout portions 17 and 18 to form a rear cutout 19 in the finished jacket 6, which rear cutout 19 is aligned with the cutout 16. The two cutouts 16 and 19 permit a portion of the test sheet 7 to project in a position where it may be readily grasped by a student to pull the test sheet out of the jacket.

The jacket 6 has a relatively large rectangular opening 20 in the upper portion of the front panel 9 and a smaller opening 21 is disposed adjacent the large opening 20. The front panel 9 is provided with indicia indicating the opening 20 as being a question block and the opening 21 as being an answer block. It is to be understood that any suitable instructions may be placed on the front panel 9.

The test sheet 7 is divided into one or more test sections. Each test section constitutes a question area 22, a student's answer area 23, and a correct answer area 24. When the test sheet 7 is initially positioned within the jacket 6, the question area 22 and the student's answer area 23 of the first test section will appear in the opening 20. The student is to read the question and then write his answer in the student's answer area 23. Then, the student is to pull the test sheet 7 partially out of the jacket 6 to the point that the correct answer area 24 is aligned with the opening 21. The student may then compare his answer with the correct answer. In this manner, the student can take the test and correct the test without aid and at the same time, the student is given an opportunity to honestly answer the test.

When the test sheet 7 is provided with more than one question, the lower part of each test section will be provided with stop indicating means in the form of a stop line 25 for registering generally with the lower edge of the opening 20 to indicate to the student the limit to which the test sheet 7 is to be pulled from the jacket 6 for a particular question. By observing the stop line 25, the student will not cause the correct answer to appear within the opening 21 accidentally to thereby defeat the purpose of the test device.

From the foregoing, it will be readily apparent that there has been devised an extremely simple self-testing device for students, which device is readily printed in the customary manner and is stored in the same jacket used for the test purposes. Further, the self-testing device is so constructed wherein if properly utilized, the student has a fair chance of considering the question and writing in his answer prior to being advised as to the correct answer. In this manner, a student may obtain an honest appraisal of his knowledge of a particular subject.

Although a preferred embodiment of the invention has been illustrated and described, it is to be understood that minor modifications may be made in the example structure within the scope and spirit of the invention, as defined in the appended claims.

What is claimed as new:

1. A simple self-testing device comprising a flat jacket having at least one open end and at least one one-piece test sheet disposed within said jacket for progressive sliding movement out of said jacket through said open end as questions are first answered and the correct answer visually ascertained, said test sheet having a plurality of test sections, each test section including a question area, a student's answer area and a correct answer area, said jacket including a panel having two openings therein, one of said openings being for displaying said question area and said student's answer area, and the other of said openings being for displaying said correct answer area, said openings and said areas of said test section being in offset misaligned relation whereby said question area and said student's answer area are first visible in said one opening and said corect answer area is visible in the other of said openings only after said test sheet is partially withdrawn from said jacket through said jacket open end.

2. The self-testing device of claim 1 wherein said one opening is relatively large as compared to the other of said openings with the relative sizes of said one opening and said question area and said student's answer area being such that both said question area and said student's answer area are simultaneously visible through said one opening.

3. The testing device of claim 1 wherein said student's answer area and said correct answer area are in transversely adjacent relation as compared to the movement of said test sheet out of said jacket to facilitate the comparison of the student's answer and the correct answer.

4. The testing device of claim 1 wherein said test sheet has stop indicating means for indicating the limit of movement of said test sheet within said jacket for each test section.

5. The testing device of claim 1 wherein said test sheet has stop indicating means for indicating the limit of movement of said test sheet within said jacket for each test section, said stop indicating means being below said student's answer area and alignable with a lower edge of said one opening as compared to the direction of travel of said test sheet in said jacket.

6. A simple self-testing device comprising a flat jacket having at least one open end and at least one-piece test sheet disposed within said jacket for progressive sliding movement out of said jacket through said open end as questions are first answered and the correct answer visually ascertained, said test sheet having a plurality of test sections, each test section including a question area, a student's answer area and a correct answer area, said question areas and said student's answer areas being disposed in alternating relation in a first column and said correct answer areas being in a second column adjacent said first column, said jacket including a panel having two openings therein in alignment with said columns and in transversely adjacent relation as compared to said columns, one of said openings being for displaying said question area and said student's answer area, and the other of said openings being for displaying said correct answer area, said openings and said areas and said test section being in offset misalignment relation whereby said first question area and said student's answer area are first visible in said one opening and said correct answer area is visible in the other of said openings only after said test sheet is partially withdrawn from said jacket through said jacket open end.

References Cited in the file of this patent

UNITED STATES PATENTS

| | | |
|---|---|---|
| 1,641,982 | McDade | Sept. 13, 1927 |
| 1,732,815 | Knight | Oct. 22, 1929 |
| 2,169,266 | Matter | Aug. 15, 1939 |
| 2,178,906 | Haumerson | Nov. 7, 1939 |
| 2,863,226 | Kelly | Dec. 9, 1958 |
| 3,032,892 | Palmer | May 8, 1962 |
| 3,046,675 | Schure | July 31, 1962 |